(12) United States Patent
Wolf et al.

(10) Patent No.: US 9,211,779 B2
(45) Date of Patent: Dec. 15, 2015

(54) COMFORT AIR VENT NOZZLE

(75) Inventors: Walter Wolf, Oppenweiler-Zell (DE); Salah Benamira, Stuttgart (DE); Marco D'Angelo, Pratteln (CH); Axel Tidelski, Leinfelden-Echterdingen (DE); Kuno Zeller, Stuttgart (DE); Uwe Fritsche, Remseck am Neckar (DE); Holger Wanke, Pleidelsheim (DE)

(73) Assignee: MAHLE International GmbH, Stuttgart (DE)

( * ) Notice: Subject to any disclaimer, the term of this patent is extended or adjusted under 35 U.S.C. 154(b) by 725 days.

(21) Appl. No.: 13/542,437

(22) Filed: Jul. 5, 2012

(65) Prior Publication Data

US 2013/0059520 A1    Mar. 7, 2013

Related U.S. Application Data

(63) Continuation of application No. PCT/EP2010/070643, filed on Dec. 23, 2010.

(30) Foreign Application Priority Data

Jan. 4, 2010 (DE) .......................... 10 2010 004 021

(51) Int. Cl.
*B60H 1/34* (2006.01)
(52) U.S. Cl.
CPC .................... *B60H 1/3457* (2013.01)
(58) Field of Classification Search
CPC .................................................. B60H 1/3457
USPC ............................................... 454/154, 155
See application file for complete search history.

(56) References Cited

U.S. PATENT DOCUMENTS

| 7,014,557 B2 * | 3/2006 | Thomassin et al. ............. 454/76 |
| 7,597,616 B2 | 10/2009 | Browne et al. |
| 8,038,516 B2 | 10/2011 | Klingler et al. |
| 2010/0261422 A1 | 10/2010 | Sakakibara |

FOREIGN PATENT DOCUMENTS

| CN | 101213101 A | 7/2008 |
| CN | 101448661 A | 6/2009 |
| CN | 101460325 A | 6/2009 |
| DE | 37 36 448 A1 | 5/1989 |
| DE | 3736448 A * | 5/1989 |
| DE | 10 2004 038 016 A1 | 7/2005 |
| DE | 10 2007 013 868 A1 | 9/2008 |

(Continued)

OTHER PUBLICATIONS

Chinese Office Action for Chinese Application No. 201080060504.2 dated Apr. 17, 2014 with English translation.

*Primary Examiner* — Steven B McAllister
*Assistant Examiner* — Jonathan Cotov
(74) *Attorney, Agent, or Firm* — Muncy, Geissler, Olds & Lowe, P.C.

(57) ABSTRACT

An air discharging device for discharging an air flow into a vehicle interior is provided that includes a first air conducting device that can be adjusted with respect to the air discharging characteristic thereof, the air conducting device lying in a first air through-flow region of the air discharging device. The air discharging device also includes a second air conducting device that can be adjusted with respect to the air discharging characteristic thereof, the air conducting device lying in a second air through-flow region of the air discharging device.

13 Claims, 3 Drawing Sheets

(56) References Cited

FOREIGN PATENT DOCUMENTS

| | | |
|---|---|---|
| DE | 20 2008 008 827 U1 | 11/2008 |
| DE | 20 2008 017 510 U1 | 12/2009 |
| EP | 1 785 298 A1 | 5/2007 |
| EP | 1 656 271 B1 | 1/2008 |
| EP | 1 972 476 A1 | 9/2008 |
| EP | 1972476 A1 * | 9/2008 |

* cited by examiner

COMFORT AIR VENT NOZZLE

This nonprovisional application is a continuation of International Application No. PCT/EP2010/070643, which was filed on Dec. 23, 2010, and which claims priority to German Patent Application No. DE 10 2010 004 021.5, which was filed in Germany on Jan. 4, 2010, and which are both herein incorporated by reference.

BACKGROUND OF THE INVENTION

1. Field of the Invention

The present invention relates to an air discharging device for discharging an air stream, particularly into a vehicle interior, with at least one air conducting device, which is adjustable at least with respect to its air discharging characteristics and which is disposed in at least one first air discharge region of the air discharging device.

2. Description of the Background Art

During the ventilation of closed interior spaces, such as, for example, of motor vehicles, air is drawn in very generally at one or at a number of places, processed, and delivered into the interior space to be ventilated. In this case, air can be taken in both from the environment and/or at least in part and/or at least intermittently also from the interior space itself, which is to be ventilated (so-called recirculated air operation). The air so drawn in is processed, for example, by heating (heating operation), cooling (air conditioning operation), and/or filtering (removal of dirt particles, pollen, and the like).

In particular in the case of ventilation of vehicle interiors, a number of places are usually provided where the processed air flows into the vehicle interior. For example, air supply openings, which are oriented in the direction of the windshield, in the direction of the side windows, and/or in the direction of the driver/passenger footwell, and air supply openings, which are provided in the area of the dashboard and aim in the direction of the driver/passenger, are typically provided today. In this regard, different air discharge characteristics are desirable depending on the position of the air delivery opening. Thus, for example, the airflow in the footwell of the driver/passenger should occur as diffusely as possible to avoid undesirable drafts. In the case of air discharge in the direction of the windshield or side windows, in contrast, a directed air stream is generally practical, for example, to be able to defrost the window in question as quickly as possible.

In the case of air delivery openings which are positioned in the dashboard, the task is more complex. Thus, depending on the ambient conditions and/or depending on the personal preferences of the driver or passenger, it is desirable to make available a diffuse air discharge at certain times but a directed air discharge at other times (so-called spot ventilation operation).

To be able to satisfy such high comfort requirements, it is basically possible to provide two different types of air vent nozzles, namely, spot air discharge nozzles, on the one hand, and diffuse air vent nozzles, on the other. In this type of approach, however, the installation space required for this is problematic.

For example, German Pat. Appl. No. DE 10 2007 013 868 A1 proposed furthermore an air vent, which can deliver both a directed airflow and a diffuse airflow (vortex flow). The switching between directed air discharge (spot operation) and diffuse air delivery occurs by the adjustment of a control element. Based on the structure of the air vent nozzle proposed in DE 10 2007 013 868 A1, however, the nozzle of necessity has a circular outer contour. This type of outer contour is in fact advantageous, when it comes to being able to direct the air discharge direction in very different directions.

In the conventional art, however, because of specific installation situations in motor vehicles, a non-circular installation space is available. This is a problem, however, particularly in the motor vehicle sector, because here, on the one hand, installation space, particularly in the area of the dashboard, is extremely tight and "valuable," and, on the other, the installation space available for ventilation devices, especially in the area of the dashboard, typically does not have a circular cross-sectional shape. This generally has the result that installation space, which would have been actually available for the delivery of air, is not utilized or not optimally utilized for the release of air. As a result, the air delivery performance of the air discharge nozzle in question decreases. In order to compensate for this, it is possible to increase the blower output, which, however, can lead to increased operating noise and to an increased use of energy for driving the various different blower devices. This is naturally a disadvantage.

A proposal in the case of a non-circular installation situation to realize the most efficient air vent nozzle possible was made in German Offenlegungsschrift No. DE 10 2004 038 016 A1, which corresponds to U.S. Pat. No. 8,038,516, which is incorporated herein by reference. There, for the improved utilization of a substantially rectangular installation space it is proposed to design an air vent nozzle with two air vent parts, each disposed next to one another. Casually stated, this refers to two individual air vent nozzles, substantially independent and disposed next to one another. The increased production costs in particular, which arise for the production of the two air vent nozzles with a relatively complex structure, may be problematic with this type of structure, however. Moreover, installation space is also given away in the structure proposed there, even if to a lesser extent. To reduce the costs of the air vent nozzle proposed in this publication, the nozzle is made substantially without movable elements.

SUMMARY OF THE INVENTION

It is therefore an object of the present invention to provide an air discharging device that is improved compared with the state of the art.

To this end, it is proposed to design an air discharging device, which is used for discharging an air stream, particularly into a vehicle interior, and which has at least one air conducting device, which is adjustable at least with respect to its air discharging characteristics and which is disposed in at least one first air through-flow region of the air discharging device, in such a way that it has at least one second air conducting device, which is adjustable at least with respect to its air discharging characteristics and which is disposed in at least one second air through-flow region of the air discharging device. Air discharging characteristics are understood to be particularly the type of air discharge, therefore, for example, whether it emerges (in part) as a directed air jet, (in part) as a diffuse air jet, or as a combination of a diffuse and a directed air jet (for example, as some kind of a coaxial arrangement) or of an intermediate position between a directed and diffuse air jet. The air through-flow regions of the air discharging device may have substantially any shape both individually and also in combination. The relative arrangement of the through-flow regions relative to one another can also occur basically in any manner, such as, for example, next to one another, above one another, and the like. It is also possible in particular that they are arranged coaxially to one another, so that, for example, the first air through-flow region lies in the interior of the second air through-flow region (or vice versa). The arrangement of the first air through-flow region within the second air through-flow region in this case need not necessarily occur in the geometric center, but can also be offset laterally, for example. Typically, however, it is advantageous, if the arrangement of the first and second air through-flow region occurs as a coaxial arrangement. In fact, it is basically possible that the first and second air through-flow regions have a (substantially) similar outer form. Typically, however, it is usually especially advantageous, particularly in regard to an especially good utilization of the available installation space, if the first and the second air through-flow region have a different shape. In particular, the first air through-flow region can have an at least substantially circular shape, whereas the second air through-flow region (which can be arranged, for example, around the first air through-flow region) may have a polygonal, quadrangular, rectangular, or square shape (optionally also with rounded corners). Of course, it is also possible to provide a plurality of first air through-flow regions, a plurality of second air through-flow regions, and/or one or more third, fourth, etc., through-flow regions, whereby what has already been stated can be applied in an analogous form. It is basically possible that the individual air conducting devices can be adjusted independently of one another at least in sections and/or at least partially. This may allow for an especially individual adjustment to different comfort requirements. A simpler operation and/or optionally also a simpler structure of the air discharging device can result, however, if at least two air conducting devices are adjusted together at least in sections and/or at least partially. For example, the air discharging characteristics of the entire air discharging device can be changed by actuating a single control knob with which the air discharging characteristics can be adjusted. In each case, the providing of at least two air conducting devices makes it generally possible to change an especially large amount of (optionally also the entire) airflow leaving the air discharging device with respect to its air discharging characteristics. In addition, the providing of a plurality of air through-flow regions makes it possible to be able to adapt the shape of the air discharging device especially well to existing installations space specifications. Nevertheless, a surprisingly simpler and more cost-effective structure of the air discharging device can be realized with the proposed air discharging device.

It is advantageous, if in the case of the air discharging device at least one first air conducting device and/or at least one second air conducting device has at least one operating position with directed air discharging characteristics and/or at least one operating position with diffuse air discharging characteristics, and preferably can assume operating positions with intermediate characteristics. The experience in the motor vehicle sector has shown that some of the users of motor vehicles would like to have a directed airflow "blown at" the head region if possible, other users of motor vehicles would like to be "blown at" with as diffuse an airflow as possible, and still other users of motor vehicles would like to be "blown at," for example, depending on different ambient conditions, at times with a directed but at other times with a diffused airflow. Some users of motor vehicles, however, also prefer (at least at times) a "mixed form" between these extreme values. These different requirements can be met with the proposed design form of the air discharging device in a particularly comprehensive manner.

It can prove advantageous, furthermore, if in the case of the air discharging device at least one first air conducting device and at least one second air conducting device are designed integral with one another at least in sections and/or at least partially. The assembly of the air discharging device and the installation of the air discharging device, for example, in a motor vehicle can generally be simplified in this way. The structure of the air discharging device can also become simpler, as a result of which, for example, an overall more cost-effective construction of the air discharging device is possible. The operational safety and lifetime of the air discharging device, however, can also improve with an integral construction.

It is possible in particular to design the air discharging device in such a way that at least one first air conducting device and at least one second air conducting device are coupled together at least in sections and/or at least partially, and preferably are designed at least partially and/or at least in sections force fittingly or form fittingly with one another, non-displaceable, rotationally fixed, integrally, and/or as a single piece. Here as well, the structure of the air discharging device can become simpler, the production costs decline, and the installation of the air discharging device, for example, in a motor vehicle become simpler. It is also possible in particular that the ease of use of the air discharging device is simplified, for example, in that a number of (optionally also all) air conducting devices can be operated simultaneously with a single operating element. In particular, the production costs can often be reduced with an integral and/or one-piece structure. In contrast, it is often possible with a multipart structure to adapt the individual parts of the air discharging device (for example, the particular air conducting devices) in each case better than to their particular individual task.

It is possible in particular to design the air discharging device in such a way that at least one air conducting device, particularly at least one first air conducting device, is disposed at least partially and/or at least in sections in a radially inner air through-flow region and/or at least one air conducting device, particularly at least one second air conducting device, is disposed at least partially and/or at least in sections in a radially outer air through-flow region. With this type of "coaxial" structure of the air discharging device, it is usually especially simple, on the one hand, to be able to realize the most extensive adaptation possible of the air discharging device to existing installation space specifications, but, on the other, to be able to realize an air discharging device as extensively adjustable as possible and adaptable to individual user wishes.

It is particularly advantageous if in the case of the air discharging device at least one air through-flow region has at least partially and/or at least in sections an at least substantially round, circular, oval, polygonal, quadrangular, rectangular, square, and/or rounded shape. It is conceivable in particular that a first air through-flow region (particularly an inner air through-flow region) has a round or circular shape. It is conceivable in particular further that at least one second air through-flow region (particularly an outer air through-flow region) can have a substantially oval, polygonal, quadrangular, rectangular, and/or square shape, which in particular may also have rounded corners. Of course, it is also possible that the shaping can occur in a different way, to follow, for example, an especially irregularly shaped available installation space (which can apply especially but not only to an outer air through-flow region).

It is especially advantageous further if the air discharging device is designed in such a way that in this device at least one air conducting device in at least one operating position, particularly in an operating position in which there are directed air discharging characteristics and/or diffuse air discharging characteristics, at least in sections and/or at least partially follows a shape of at least one air through-flow region. As a result, an especially efficient and effective air discharging device can be realized. In this case, in particular, an outer contour or inner contour of the air conducting device should be considered in terms of "shaping" of the air conducting device, so that it can "nestle" as it were with its edges against a boundary wall of the air discharging device.

An especially advantageous structural design of the air discharging device results if in this device at least one air conducting device, particularly at least one first air conducting device, has at least one air guiding element in the nature of a vane wheel with at least one vane, whereby each vane is formed by at least two segments which are disposed axially one behind the other and are adjustable in an angular manner relative to one another. This type of structure has already proven successful in practice, and moreover can be realized relatively simply and cost-effectively.

It can also prove especially advantageous if in the case of the air discharging device at least one air conducting device, particularly at least one second air conducting device, has at least one air guiding element in the nature of at least one outwardly extending ring of rays with at least one ray-like outwardly directed vane, whereby each vane is formed by at least two segments which are disposed axially one behind the other and are adjustable in an angular manner relative to one another. This structural form in a certain sense represents a broadening, generalization, or a variation of the aforementioned design principle. Hence, it is also possible in this connection that a relatively simple and cost-effective air discharging device, durable and lasting in practice, can be realized.

It is possible in particular if in the case of the air discharging device at least one vane, disposed like a vane wheel, and at least one vane, disposed like a ring of rays, align at least substantially with one another in the radial direction at least partially and/or at least in sections and/or are disposed at least substantially offset to one another in the radial direction at least partially and/or at least in sections. Particularly in the case of an arrangement of vanes, aligned when seen in the radial direction, mechanically especially strong structural parts can be realized, which in the end can also result in an especially stable air discharging device. In an arrangement of at least two vanes, offset to one another when seen in the radial direction, it is possible that the particular vanes can be adapted especially well to special installation space specifications, which can prove advantageous. In both cases, moreover, also noise reducing properties can result by the prevention of resonance or by the formation of destructive interferences.

It can be advantageous if in the case of the air discharging device at least two vane segments of at least one vane, particularly at least one vane, disposed like a vane wheel, have at least in sections and/or at least partially an at least substantially similar shape. With this type of structure, often an especially more effective influencing of the airflow can be realized, so that it is possible in particular to realize an especially largely diffuse airflow.

Likewise, it can prove advantageous in the case of the air discharging device, if in said device at least two vane segments of at least one vane, particularly at least one vane, disposed like a ring of rays, have at least partially and/or at least in sections an at least substantially different shape. It is possible in particular with this type of structural design that the vanes, especially in regard to their outer contours, can be adapted especially well to the available installation space, or to the boundary walls of the air discharging device. This can prove to be advantageous as well.

It is advantageous, moreover, if in the case of the air discharging device at least one air conducting device, particularly at least one first air conducting device, is disposed movable and/or at least one air conducting device, particularly at least one second air conducting device, is disposed rigidly. A movably disposed air conducting device is to be understood particularly as an air vent nozzle, which can be turned around one axis or two axes in such a way that the air jet delivered into the interior can be released in different directions. With such a movable arrangement, the air discharging device can thus be adapted especially well to different comfort requirements and vehicle passengers of different heights. In the case of a rigid arrangement of at least one air conducting device (therefore in such a way that typically the direction of the released air jet cannot be changed), it is often possible, however, to be able to use the available installation space "to the edge"; this can be advantageous particularly in angular and/or especially unusually shaped available installation spaces.

It is advantageous further, if the air discharging device has at least one air passage changing device, particularly at least one air shutoff device. An air passage changing device in this case is understood to be particularly a device with which the air volume flowing through the air discharging device can be changed (with unchanging boundary conditions). As a result, a further, usually extremely desirable adjustment option of the air discharging device can be realized. In particular, the air passage changing device can be designed so that it covers a control range that can lead up to a complete air shutoff.

It is advantageous, further, if in the case of the air discharging device at least one air passage changing device and at least one air conducting device can be adjusted at least partially and/or at least in sections by at least one mutual control element. An especially convenient adjustability of the air discharging device can be realized in this way. It is often especially advantageous, if an especially large number of the air conducting devices (optionally also all) can be adjusted with the aid of a mutual control element. An especially high ease of use can result in this way as well.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
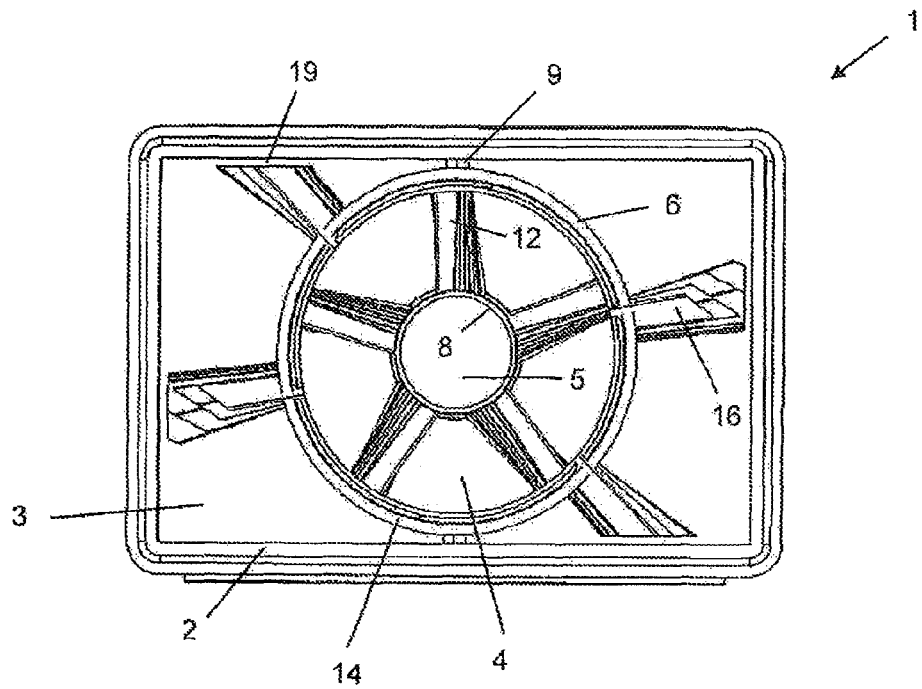
FIG. 1 shows a comfort air vent nozzle in two different positions, each in a schematic plan view.
Figure 1B:
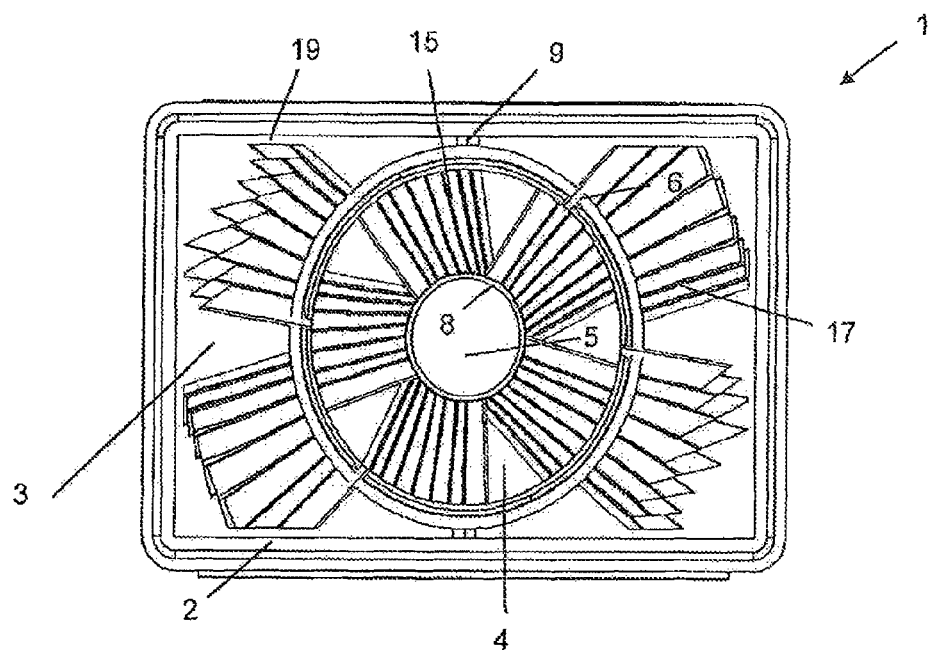

In the two drawings of FIG. 1, in each case a comfort air vent nozzle 1 is shown each in different positions in a schematic plan view. In this case, the position of comfort air vent nozzle 1, shown in FIG. 1a, corresponds to an operating position in which comfort air vent nozzle 1 provides a directed air jet (so-called spot discharge operation). In FIG. 1b, in contrast, an operating position of comfort air vent nozzle 1 is shown in which comfort air vent nozzle 1 releases a diffuse airflow.

Comfort air vent nozzle 1 is typically installed in the area of the dashboard of a motor vehicle. Comfort air vent nozzle 1 is generally used for ventilating the head region or the chest region of the vehicle passengers, particularly the front passengers of a motor vehicle. Here, the problem occurs that some passengers would like to be "blown at" with a rather directed air jet, whereas other passengers prefer a diffuse airflow. In part, these individual preferences also change depending on the ambient conditions. Comfort air vent nozzle 1 proposed in the present case has the great advantage that depending on its adjustment it can release both a directed airflow (air spot) and a diffuse airflow. As a result, in the case of a small installation space requirement, especially high comfort requirements of the vehicle passengers can be satisfied.

Another problem in current motor vehicles is that because of the large number of components to be installed (also, but not only, in the area of the dashboard), the available installation space should be used as effectively as possible. Because of other controls, display instruments, control elements, and other components, typically disposed in the area of the dashboard, differently shaped installation spaces are conceivable here, which in each case should be utilized as optimally as possible. To enable equipment satisfying individual wishes and requirements in a motor vehicle, substantially rectangular installation spaces have gained acceptance in practice, in which different components can be used for the given situation (for example, components of a stereo system, an air conditioning system control device, and the like). This rectangular "grid pattern" of components has meanwhile also been advantageously assessed as aesthetic by many vehicle passengers.

Accordingly, a substantially rectangular installation space is often available for the installation of air-releasing components (such as, for example, an air vent nozzle or a comfort air vent nozzle 1). Accordingly, comfort air vent nozzle 1, shown in FIG. 1, is designed with a substantially rectangular outer frame 2 (the corners are made rounded in the present case), so that comfort air vent nozzle 1 can be used easily and without unnecessary "loss" of installation space in a rectangular air delivery duct or in a rectangular air release opening in the dashboard of a motor vehicle. Naturally, comfort air vent nozzle 1, depending on installation space specifications, can also be adjusted to differently shaped installation spaces (whereby preferably also the inner structure should be suitably adjusted).

As can be gathered from both FIG. 1a and FIG. 1b, the area within outer frame 2 is divided substantially into three different air discharge regions 3, 4, 5. Outer air discharge region 3 lies outside vortex housing 6, whereas middle air discharge region 4 is disposed within vortex housing 6. In the middle of vortex housing 6, inner ring elements 8 of the individual air guiding discs 7.1 to 7.n (in the present case 7.1 to 7.8; compare also FIGS. 3 and 4) form in addition (in some structural designs of comfort air vent nozzle 1) an inner air discharge region 5. Both middle air discharge region 4, placed outside the ring element, and also outer air discharge region 3 in this case can be changed in regard to their air discharging characteristics between the operating position "spot air discharge," shown in FIG. 1a, and the operating position "diffuse air discharge," shown in FIG. 1b, by the angular turning of individual air guiding discs 7 against each other. In contrast, inner air discharge region 5 in the present exemplary embodiment of comfort air vent nozzle 1 is always in a "spot operation" in which a directed air jet is delivered. Naturally, it is possible to provide inner air discharge region 5 with a larger or smaller air through-flow cross section, to cover the opening of inner air discharge region 5 (so that no air can flow through here), and/or instead of inner air discharge region 5 to provide an operating element, for example, a type of knob, with the aid of which the airflow can be adjusted between the two operating positions shown in FIG. 1a and FIG. 1b. It should be pointed out only for the sake of completeness that comfort air vent nozzle 1 can be placed preferably also in intermediate positions, which lie between the "extreme positions" shown in FIG. 1a and FIG. 1b.

Figure 2:
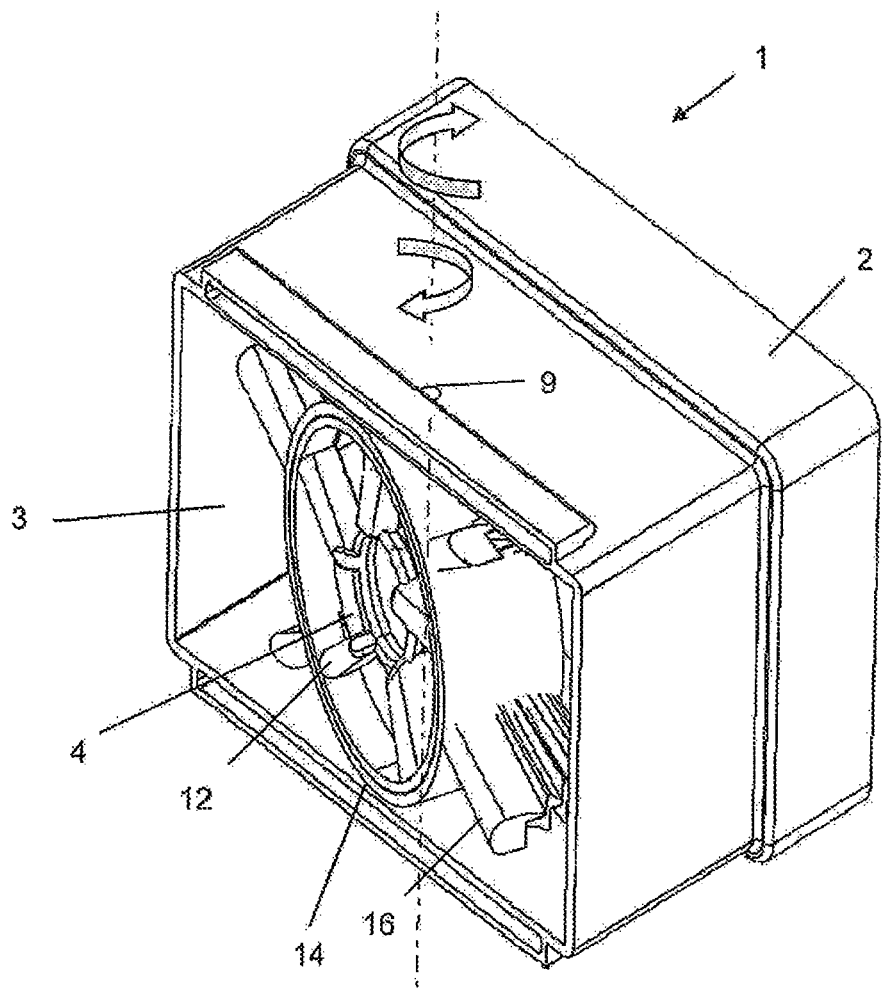
FIG. 2 shows the comfort air vent nozzle of FIG. 1 in a schematic perspective view.

Vortex housing 6 in the present exemplary embodiment of comfort air vent nozzle 1 is disposed pivotable around a perpendicular pivot axis 9 in the present case (compare particularly also FIG. 2). It is thereby possible that the airflow emerging from the middle air discharge region 4 and/or from the inner air discharge region 5 can be directed in different directions. It should be pointed out in this regard that adjustment of vortex housing 6 typically also has a certain effect on the discharge direction of the airflow emerging from the outer discharge region 3. In addition, it is also possible that pivot axis 9 is disposed horizontally (or obliquely). Of course, it is also possible that vortex housing 6 has a bi-axial design, for example, so that a "two-dimensional" pivoting movement of vortex housing 6 is possible with the released air jet to be directed substantially in any direction.

The actual adjusting element 10, allowing for a switch to be made between the operating mode "directed airflow," shown in FIG. 1a, and the operating mode "diffuse airflow," shown in FIG. 1b, consists of a stack 11 of a total of 8 air guiding discs 7.1, 7.2, ... 7.8 in the present case. The individual air guiding discs 7.1 to 7.8 are disposed here in stack 11 lying directly against one another. Each of air guiding discs 7 in the present exemplary embodiment of comfort air vent nozzle 1 in the middle air discharge region 4 has five inner air guiding wings 12, which extend between inner ring element 8 and outer ring element 13 of each air guiding disc 7. Outer ring elements 13 of the foremost air guiding disc 7.1 and the rearmost air guiding disc 7.8 are each placed rotatable in guide grooves of retaining elements 14. Retaining elements 14 in the present exemplary embodiment together with outer ring elements 13 thus form vortex housing 6. The individual air guiding discs 7.1 to 7.8 can be pivoted in an angular manner against one another (whereby the maximum allowable pivoting range is limited by suitably disposed stop elements 18 between the positions shown in FIG. 1a and FIG. 1b). Depending on the position of air guiding discs 7, and thereby of the individual air guiding wings 12, to one another, different operating modes of comfort air vent 1 result. If air guiding wings 12 are disposed substantially aligned to one another (compare FIGS. 1a and 3), the airflow passing through outer air discharge region 3 and middle air discharge region 4 through comfort air vent nozzle 1 is substantially not "swirled," so that a substantially totally directed airflow is released from comfort air vent nozzles 1. If air guiding discs 7, in contrast, are rotated maximally to one another (compare FIG. 1b), then air guiding wings 12 form an air guiding vane 15, with which the airflow passing through the corresponding air discharge regions 3, 4 are "swirled" maximally, so that a diffuse airflow is released from comfort air vent 1 into the corresponding regions.

The comfort air vents nozzles 1 proposed in the present case based on their structure within vortex housing 6 resemble the air vent, described in German Offenlegungsschrift No. DE 10 2007 013 868 A1, with a vortex flow and directed flow. The disclosed content of this application publication is incorporated in its entirety into the disclosed content of the present application.

In addition, comfort air vent nozzles 1 proposed in the present case, however, also have wing extensions 16, which are disposed on the outer side of outer ring elements 13 of the various air guiding discs 7.1 to 7.8. With an angular rotation of air guiding discs 7.1 to 7.8 against one another, wing extensions 16 also change their relative arrangement to one another, whereby these (like air guiding wings 12) can be adjusted between an arrangement substantially aligned to one another (FIG. 1a; whereby a substantially directed airflow is released from the middle air discharge region 4) and an arrangement offset to one another (FIG. 1b; in this case, wing extensions 16 form air guiding vanes 17 analogous to the middle air discharge region 14, so that a diffuse airflow can be released also from the outer air discharge region 3).

Due to the proposed (outer) wing extensions 16, also outer air discharge region 3 (adjustable with respect to its air discharging characteristics) can thereby be used for releasing an airflow. The overall available installation space can be utilized much more effectively as a result.

Figure 3:
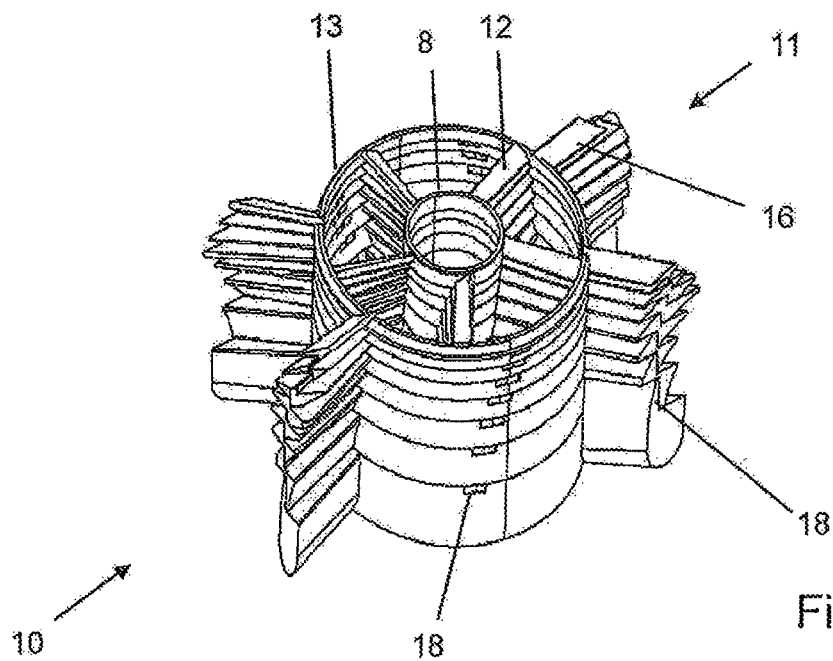
FIG. 3 shows the set of air influencing discs, used for the comfort air vent nozzle of FIGS. 1 and 2, in a schematic perspective view.
Figure 4:
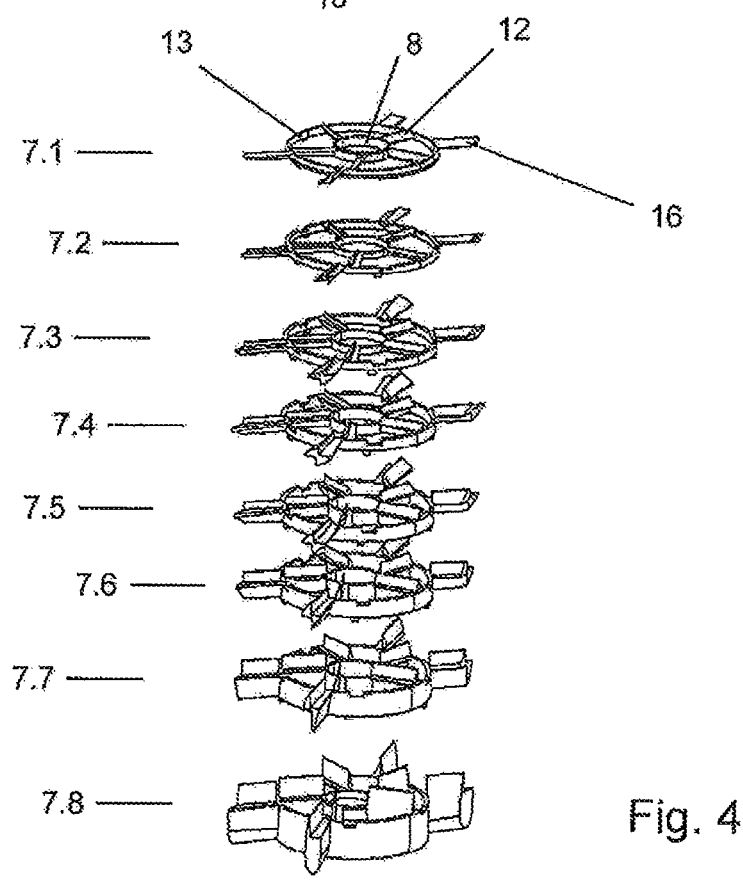
FIG. 4 shows the set of air influencing discs of FIG. 3 in an exploded view.

As is evident particularly based on FIG. 3, it is possible that stop elements 18 which limit the angular adjustability of the individual air guiding discs 7.1 to 7.8 against one another can be provided in any manner in the area of wing extensions 16, outer ring elements 13, air guiding wing 12, and/or inner ring elements 8.

It is evident further from the figures that in the here shown exemplary embodiment of comfort air vent nozzles 1 four wing extensions 16 are provided per air guiding disc 7. The number of wing extensions 16 in this case corresponds to the number of corners of outer frame 2. This also applies to the positioning of wing extensions 16 on outer ring element 13. Typically in this case, wing extensions 16 have a "middle" air guiding disc 7 (for example, 7.4 or 7.5) substantially in the direction of the corresponding corner of outer frame 2. Moreover, the specific outer edge 19 of wing extensions 16 is designed so that it does not "collide" in any allowable angular region (therefore particularly neither in the operating mode shown in FIG. 1a nor in FIG. 1b) with outer frame 2 of comfort air vent nozzle 1. It should be pointed out only for the sake of completeness that naturally it is also possible to provide "intermediate" wing extensions 16 between two corners of outer frame 2 (and thereby "intermediate" outer air guiding vanes 17).

Stated in other words, the number, arrangement, size, position, and shape of wing extensions 16 are adapted in regard to outer frame 2. The position, size, arrangement, number, and shape of inner air guiding wings 12, in contrast, can be adapted preferably to an influence on the air as effective as possible and/or cost-effective design.

It should be pointed out only for the sake of completeness that the statements particularly in regard to the position, arrangement, size, number, and shape of the inner air guiding wings 12 and the outer wing extensions 16 can also apply to other structural designs of (comfort) air vent nozzles. It is also possible, of course, to use a number of air guiding discs 7, which differs from that in the exemplary embodiment described in the present case. In other respects, it is also definitely possible that the number of air guiding wings 12 and wing extensions 16, which are disposed within an air guiding vane 15 or within an outer air guiding vane 17, differs; thus, for example, individual air guiding discs 7 are made (partially) without air guiding wings 12 or without wing extensions 16.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An air discharging device for discharging an air stream into a vehicle interior, the air discharging device comprising:
at least one first air conducting device that is adjustable with respect to its air discharging characteristics and that is disposed in at least one first air through-flow region of the air discharging device; and
at least one second air conducting device that is adjustable at least with respect to its air discharging characteristics and that is disposed in at least one second air through-flow region of the air discharging device,
wherein the at least one first air conducting device has at least one air guiding element configured as a rotatable vane wheel having an inner ring element and an outer ring element with at least one vane connected between the inner ring element and the outer ring element, each vane being formed by at least two segments that are disposed axially behind one another and that are adjustable in an angular manner relative to one another,
wherein the at least one second air conducting device has at least one air guiding element configured as at least one outwardly extending ring of rays with at least one ray-like outwardly directed vane that extends from an outer surface of the outer ring element, each vane being formed by at least two segments that are disposed axially behind one another and that are adjustable in an angular manner relative to one another, and
wherein, in a non-rotated state of the vane wheel, the vanes of the at least one second air conducting device extend from the outer surface of the outer ring at positions that are radially offset with respect to positions at which the vanes of the at least one first air conducting device connect to an inner surface of the outer ring the air discharging device further comprising an outer frame that includes the vane wheel therein, wherein the vane wheel is connected to the outer frame by a pivot member that forms a pivot axis, such that the vane wheel is pivotable with respect to the outer frame along the pivot axis.

2. The air discharging device according to claim 1, wherein the at least one first air conducting device and/or the at least one second air conducting device has at least one operating position with directed air discharging characteristics and/or at least one operating position with diffuse air discharging characteristic and assumes operating positions with intermediate characteristics.

3. The air discharging device according to claim 1, wherein the at least one first air conducting device and the at least one second air conducting device are designed integral with one another at least in sections and/or at least partially.

4. The air discharging device according to claim 1, wherein the at least one first air conducting device and the at least one second air conducting device are coupled together at least in sections and/or at least partially, and are configured at least partially and/or at least in sections force fittingly or form fittingly with one another, non-displaceable, rotationally fixed, integrally, and/or as a single piece.

5. The air discharging device according to claim 1, wherein the at least one first air conducting device is disposed at least partially and/or at least in sections in a radially inner air through-flow region and/or wherein the at least one second air conducting device is disposed at least partially and/or at least in sections in a radially outer air through-flow region.

6. The air discharging device according to claim 1, wherein at least one air through-flow region has at least partially and/or at least in sections an at least substantially round, circular, oval, polygonal, quadrangular, rectangular, square, and/or rounded shape.

7. The air discharging device according to claim 1, wherein at least one air conducting device in at least one operating position in which there are directed air discharging characteristics and/or diffuse air discharging characteristics, at least in sections and/or at least partially, follows a shape of at least one air through-flow region.

8. The air discharging device according to claim 1, wherein at least two vane segments of the at least one vane disposed like the vane wheel have at least in sections and/or at least partially an at least substantially similar shape.

9. The air discharging device according to claim 1, wherein at least two vane segments of the at least one vane disposed like the ring of rays have at least partially and/or at least in sections an at least substantially different shape.

10. The air discharging device according to claim 1, wherein the at least one first air conducting device is disposed movable and/or the at least one second air conducting device is disposed rigidly.

11. The air discharging device according to claim 1, wherein the air discharging device has at least one air passage changing device, particularly at least one air shutoff device.

12. The air discharging device according to claim 11, wherein the at least one air passage changing device and the at least one air conducting device are adjustable at least partially and/or at least in sections by at least one mutual control element.

13. The air discharging device according to claim 1, wherein the at least one second air conducting device has less vanes than the at least one first air conducting device.

* * * * *